United States Patent
Suzuki et al.

(10) Patent No.: US 9,081,095 B2
(45) Date of Patent: Jul. 14, 2015

(54) RANGE IMAGE SENSOR

(75) Inventors: Takashi Suzuki, Hamamatsu (JP);
Mitsuhito Mase, Hamamatsu (JP);
Tomohiro Yamazaki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 202 days.

(21) Appl. No.: 13/578,048

(22) PCT Filed: Feb. 23, 2011

(86) PCT No.: PCT/JP2011/054006
§ 371 (c)(1),
(2), (4) Date: Aug. 9, 2012

(87) PCT Pub. No.: WO2011/105438
PCT Pub. Date: Sep. 1, 2011

(65) Prior Publication Data
US 2012/0312966 A1    Dec. 13, 2012

(30) Foreign Application Priority Data

Feb. 26, 2010    (JP) ................................. 2010-043467

(51) Int. Cl.
*G01J 1/46* (2006.01)
*G01S 7/486* (2006.01)
*H01L 27/146* (2006.01)
*G01S 17/89* (2006.01)
*H01J 1/46* (2006.01)

(52) U.S. Cl.
CPC . *G01S 17/89* (2013.01); *G01J 1/46* (2013.01); *G01S 7/4863* (2013.01); *H01J 1/46* (2013.01)

(58) Field of Classification Search
CPC ... H04N 3/155; H04N 5/3742; H04N 5/3559; H04N 5/353; H04N 5/3535; G01S 17/89; G01S 7/4863; H01L 27/146; G01J 1/46
USPC ........ 250/208.1, 214 R, 214.1; 348/297–302, 348/307–309, 312
See application file for complete search history.

(56) References Cited

U.S. PATENT DOCUMENTS

| | | |
|---|---|---|
| 6,919,549 B2 | 7/2005 | Bamji et al. |
| 8,115,848 B2 * | 2/2012 | Onuki et al. .................. 348/308 |
| 2006/0027730 A1 | 2/2006 | Bamji et al. |
| 2008/0079833 A1 | 4/2008 | Ichikawa et al. |
| 2010/0308209 A1 | 12/2010 | Buettgen et al. |

FOREIGN PATENT DOCUMENTS

| | | |
|---|---|---|
| EP | 2116864 | 11/2009 |
| JP | 1-301110 | 12/1989 |
| JP | 10-281868 | 10/1998 |
| JP | 2006-523074 | 10/2006 |
| JP | 2009-47662 | 3/2009 |

* cited by examiner

*Primary Examiner* — Georgia Y Epps
*Assistant Examiner* — Don Williams
(74) *Attorney, Agent, or Firm* — Drinker Biddle & Reath LLP

(57) ABSTRACT

Since the accumulation regions fd1, fd2 are connected only to a single capacitor C1, a pixel can be decreased in size to improve spatial resolution. And, charges transferred into the accumulation regions fd1, fd2 are temporarily accumulated, thereby improving a signal-noise ratio. The driving circuit DRV conducts dummy switching so that the number of switching of the first switch Φ1 is equal to the number of switching of the second switch Φ2 after termination of the reset period within one cycle, thus making it possible to cancel offset and obtain a more accurate range image.

4 Claims, 19 Drawing Sheets

RANGE IMAGE SENSOR

TECHNICAL FIELD

The present invention relates to a range image sensor.

BACKGROUND ART

There has been so far expected an image sensor which is capable of obtaining a range image of an object. It is also expected that an actual image of an object to be measured and a range image are obtained by the same chip. The above-described range image sensor is expected to be applied to various technologies. For example, where the range image sensor is loaded on a movable body such as a ship, an automobile or aircraft, it is possible to obtain a range image of an object around the movable body. It is, thus, possible to control the behavior of the movable body on the basis of the obtained range image of the object. In factory automation (FA), when a range image of an object is obtained, the range image can be used to inspect and control the object.

A method for measuring a distance includes a TOF (time-of-flight) method. This method requires a light source (such as a pulse laser or a light emitting diode (LED)) and a light receiving element. In a range image sensor which uses a charge distributing structure, a distance is calculated by referring to a ratio of accumulated charges distributed in a certain cycle to accumulated charges different in phase therefrom. In other words, deviation of a phase of reflected return light from a phase of radiated light is taken as a distance up to an object, and charges generated in response to the return light are distributed in synchronization with a modulation cycle of the radiated light. And, a deviation amount of the phase is calculated by using a ratio of the distributed charge quantity.

The above-described method requires accumulation of charges. Therefore, where the method is employed under conditions of strong background light, accumulated capacity is saturated prior to reading a signal, resulting in deterioration of a calculated distance. It is, therefore, necessary to accumulate charges, with influences of the background light (disturbance light) being reduced.

In Patent Literature 1, charges are distributed by two light receiving portions and two accumulated capacities. At an overall imaging region, a plurality of pixels are two-dimensionally arrayed and distance information up to an object which is obtained for each of the pixels is output in a two-dimensional manner. In a structure disclosed in the document, at least two capacitors are provided within one pixel, and these two capacitors are used to cancel charges derived from background light.

A time-domain correlation image sensor disclosed in Patent Literature 2 is provided with one capacitor within one pixel, imparting a distributed signal only via a pair of switches to both electrode terminals of each capacitor to integrate electric current at different times, thereby controlling charges flowing into the capacitor and canceling electric current derived from background light.

CITATION LIST

Patent Literature

Patent Literature 1: U.S. Pat. No. 6,919,549 (Japanese Translation of International Application (Kohyo) No. 2006-523074)
Patent Literature 2: Japanese Patent Application Laid-Open No. H10-281868

SUMMARY OF INVENTION

Technical Problem

However, when consideration is given to production of two-dimensional sensors or one-dimensional line sensors, in the above-described range image sensor of Patent Literature 1, one pixel is large in size due to a large number of capacitors, thus resulting in a failure of improving spatial resolution. Further, a large number of circuit elements such as capacitors and switches will increase parasitic capacity to decrease linearity of output, and this will pose a problem. On the other hand, in the time-domain correlation image sensor disclosed in Patent Literature 2, spatial resolution is increased with a decrease in the number of capacitors. However, a switching noise is superimposed on a signal due to an increase in the number of switching circuits, by which it is impossible to calculate a distance accurately. Thus, such a problem has been posed that no conventional technologies are able to obtain an accurate range image.

The present invention has been made in view of the above problems, and it is an object of the present invention to provide a range image sensor capable of obtaining an accurate range image.

Solution to Problem

In order to solve the above-described problems, the range image sensor of the first invention is a range image sensor which is provided with an imaging region which receives reflected light of radiated light to an object and a driving circuit which drives the imaging region. The range image sensor is characterized in that the imaging region is provided with a plurality of pixels which are one-dimensionally or two-dimensionally arranged on a semiconductor substrate, each of the pixels is provided with a photosensitive region, first and second accumulation regions adjacent to the photosensitive region, first and second transfer electrodes which respectively control charges flowing into the first and the second accumulation regions, a capacitor which is electrically connected between the first and the second accumulation regions, a first switch ($\Phi 1$) interposed between a first terminal of the capacitor and the first accumulation region, a second switch ($\Phi 2$) interposed between a second terminal of the capacitor and the second accumulation region, a third switch ($\Phi 1r$) interposed between the second terminal of the capacitor and a reference potential, and a fourth switch ($\Phi 2r$) interposed between the first terminal of the capacitor and the reference potential, and the driving circuit sets a reset period during which all the first, the second, the third, and the fourth switches are turned ON at the initial time of one cycle, setting alternately a first period and a second period within one cycle, turning both the first and the third switches ON and turning both the second and the fourth switches OFF in the first period, turning both the first and the third switches OFF and turning both the second and the fourth switches ON in the second period, and imparting to the first and the second transfer electrodes modulating signals which are in synchronization with a modulating signal of the radiated light and mutually reversed in phase within the one cycle.

A noise based on quantum properties of light (photon shot noise) is increased by the square root of an exposed light quantity and a signal component is increased proportionally. Thus, the more exposure time is increased, the more a percentage of the signal component is increased, by which a signal-noise ratio is improved. As a result, the more charges which have been distributed within the first and the second accumulation regions by the first and the second transfer electrodes are integrated, the more the signal-noise ratio is improved. It is, therefore, possible to obtain an accurate range image. In other words, the modulating signal is imparted to the transfer electrodes, by which charges are integrated in a certain period of time at the first and the second accumulation regions. At the same time or after the integration, charges which have been integrated at the first accumulation region are connected to the first terminal of the capacitor in the first period, while charges which have been integrated at the second accumulation region are connected to the second terminal of the capacitor in the second period. Then, charge components contained at both the accumulation regions, in other words, background light components, are canceled within the capacitor.

Here, since each of the accumulation regions is connected only to a single capacitor, a pixel can be decreased in size to improve spatial resolution. Further, in the present invention, since charges transferred into the first and the second accumulation regions are integrated, a signal-noise ratio is improved and the number of switching of the first switch and the number of switching of the second switch on transferring charges to the capacitor are also reduced. Therefore, a switching noise is also reduced to accumulate charges according to a distance within the capacitor. And, the related charge quantities (corresponding voltages) are detected, thus making it possible to calculate an accurate distance. Still further, in the application concerned, photoelectric current is integrated as charges in a certain period of time and thereafter, distribution behaviors are conducted. Thus, a noise is lower than the case of Patent Literature 2 in which the photoelectric current is distributed directly to a capacity by using a switch.

However, where there is a difference between the number of switching of the switches on transferring charges integrated at accumulation regions to a capacitor, it is impossible to cancel offset occurring due to a larger number of connections at one of the accumulation regions. It is also difficult to obtain an accurate range image.

Therefore, in the range image sensor of the second invention, the driving circuit additionally switches the first or the second switch so that the number of switching of the first switch is equal to the number of switching of the second switch after termination of the reset period within the one cycle. In this instance, additional switching (hereinafter, referred to as dummy switching) is done, by which the number of switching of the first switch is equal to the number of switching of the second switch to cancel offset. Thus, it is possible to obtain a more accurate range image.

Further, the range image sensor of the third invention is characterized in that (a) the driving circuit imparts a modulating signal to the first transfer electrode within a specific one cycle at timing having a phase difference of 0° with respect to the modulating signal of the radiated light and imparts to the second transfer electrode a modulating signal reversed in phase to the modulating signal imparted to the first transfer electrode, (b) it imparts a modulating signal to the first transfer electrode within another one cycle at timing having a phase difference of 90° with respect to the modulating signal of the radiated light and imparts to the second transfer electrode a modulating signal reversed in phase to the modulating signal imparted to the first transfer electrode, (c) it imparts a modulating signal to the first transfer electrode within still another one cycle at timing having a phase difference of 180° with respect to the modulating signal of the radiated light and imparts to the second transfer electrode a modulating signal reversed in phase to the modulating signal imparted to the first transfer electrode, and (d) it imparts a modulating signal to the first transfer electrode within another one cycle different from the above at timing having a phase difference of 270° with respect to the modulating signal of the radiated light and imparts to the second transfer electrode a modulating signal reversed in phase to the modulating signal imparted to the first transfer electrode, and the order of the first period and the second period within each of the above-described one cycles of (a) to (d) is the same.

Where no dummy switching is used, the number of switching of the switch on transferring charges to a capacitor is different at each terminal of the capacitor. In the present invention, a difference in charges (corresponding voltages) accumulated at each of the accumulation regions is taken in the above-described four phases of (a) to (d), thus making it possible to cancel background light components and offset components as well. It is, thereby, possible to calculate an accurate distance.

Further, the range image sensor of the fourth invention is characterized in that (a) the driving circuit imparts a modulating signal to the first transfer electrode within a specific one cycle at timing having a phase difference of 0° with respect to the modulating signal of the radiated light and imparts to the second transfer electrode a modulating signal reversed in phase to the modulating signal imparted to the first transfer electrode, (b) it imparts a modulating signal to the first transfer electrode within another one cycle at timing having a phase difference of 90° with respect to the modulating signal of the radiated light and imparts to the second transfer electrode a modulating signal reversed in phase to the modulating signal imparted to the first transfer electrode, (c) it imparts a modulating signal to the first transfer electrode within still another one cycle at timing having a phase difference of 0° with respect to the modulating signal of the radiated light and imparts to the second transfer electrode a modulating signal reversed in phase to the modulating signal imparted to the first transfer electrode, and (d) it imparts a modulating signal to the first transfer electrode within another one cycle different from the above at timing having a phase difference of 90° with respect to the modulating signal of the radiated light and imparts to the second transfer electrode a modulating signal reversed in phase to the modulating signal imparted to the first transfer electrode, the order of the first period and the second period within each of the above-described one cycles of (a) and (b) is the same, and the order of the first period and the second period within each of the above-described one cycles of (c) and (d) is reversed to that within each of the one cycles of (a) and (b).

In the present invention, in the above-described two phases of (a) and (b) and the phases of (c) and (d) different from them in the order of transferring charges to the capacitor, a difference in charges (corresponding voltages) accumulated at each of the accumulation regions is taken, thus making it possible to cancel background light components and offset components as well. It is, thereby, possible to calculate an accurate distance.

As described above, since an accurate distance can be calculated at each pixel, the range image sensor of the present invention is able to obtain an accurate range image.

Advantageous Effects of Invention

According to the range image sensor of the present invention, it is possible to obtain an accurate range image.

DESCRIPTION OF EMBODIMENTS

Hereinafter, a description will be given of the range image sensor of the embodiment. The same elements will be given the same symbols and an overlapping description will be omitted.

Figure 1:
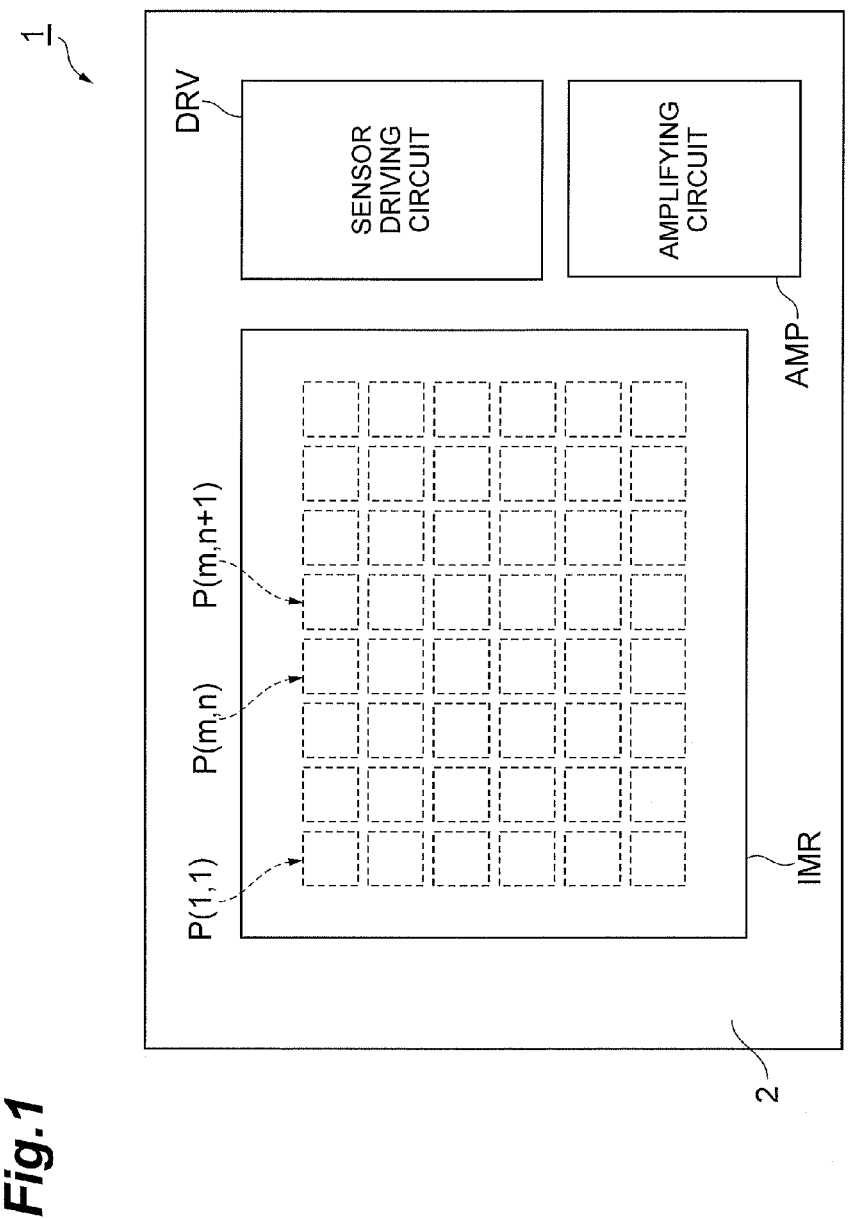
FIG. 1 is a plan view of a range image sensor according to an embodiment.

FIG. 1 is a plan view of the range image sensor according to the embodiment.

The range image sensor 1 is provided with an imaging region IMR formed on a semiconductor substrate 2, a sensor driving circuit DRV which drives the imaging region IMR, and an amplifying circuit AMP which amplifies output of the imaging region IMR. The imaging region IMR is provided with a plurality of pixels P (m, n) which are one-dimensionally or two-dimensionally arranged on the semiconductor substrate 2. The same drawing shows a pixel P (m, n) at an $m^{th}$ row and at an $n^{th}$ column (m and n are natural numbers). The imaging region IMR is to detect reflected light of radiated light to an object for each pixel, and a distance of each pixel of an image of the object can be obtained from a phase difference in each pixel between the radiated light and the reflected light. The range image sensor 1 is a charge-distributing-type range image sensor in which a phase difference corresponding to a distance is determined according to a ratio of charge quantities distributed at two sites within each pixel.

Figure 2:
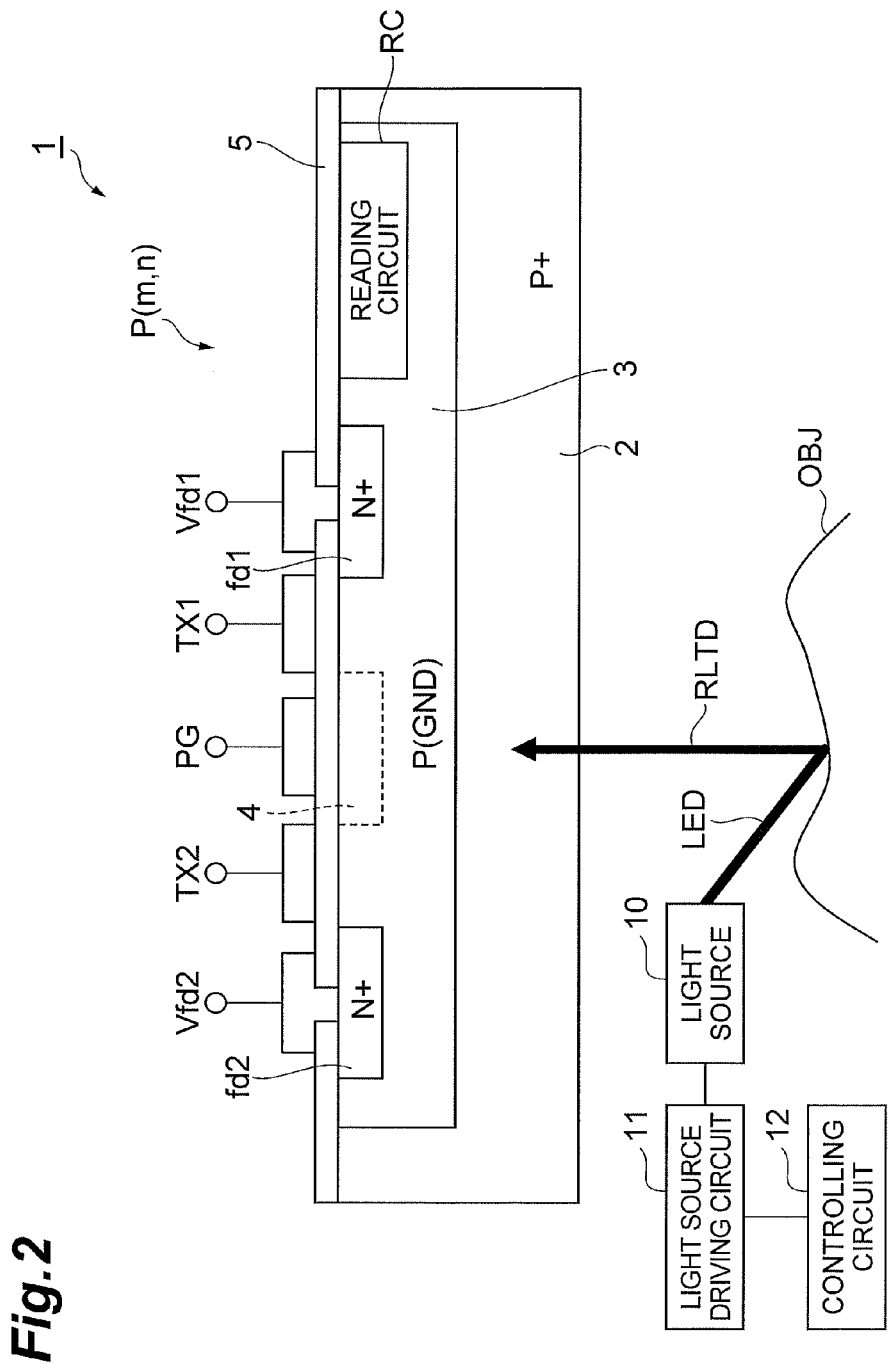
FIG. 2 is a view which shows a cross-sectional constitution of each pixel of the range image sensor given in FIG. 1 and a light source unit.

FIG. 2 is a view which shows a cross-sectional constitution of each pixel of the range image sensor given in FIG. 1 and a light source unit.

The light source unit is provided with a light source 10 such as a laser and a light emitting diode, a light source driving circuit 11 which drives the light source 10 at high frequencies, and a controlling circuit 12 which outputs a driving clock of the light source driving circuit 11. The light source 10 sends a modulating signal in which square waves or sine waves are modulated for optical intensity. In synchronization with the driving clock from the controlling circuit 12, modulating signals of square waves or those of sine waves are output also from the sensor driving circuit DRV shown in FIG. 1. The modulating signals from the sensor driving circuit DRV which are mutually reversed in phase are imparted to transfer electrodes TX1, TX2.

Radiated light of LED from the light source 10 is illuminated at an object OBJ, reflected on the surface of the object OBJ and made incident as reflected light RLTD on each pixel P (m, n) within the imaging region IMR of the range image sensor 1 from the back of the substrate. It is noted that an imaging lens (not illustrated) is placed in front of a light incident face. Further, in this example, the semiconductor substrate 2 is made thin and preferably in thickness of 50 µm or less, thereby constituting a back side incident-type range image sensor. As a matter of course, the present invention is applicable to a front side incident-type range image sensor 1 by not making thin the semiconductor substrate 2.

Each pixel P (m, n) of the range image sensor 1 is provided with a p-type (second conductive type) semiconductor region 3 formed on a surface region of a p-type (second conductive type) semiconductor substrate 2 higher in concentration at a concentration lower than that of the semiconductor substrate and a pair of n-type (first conductive type) semiconductor regions (charge accumulation regions: floating diffusion regions) fd1, fd2 higher in concentration formed on the surface side of a semiconductor region 3. Further, an insulating layer 5 is formed on the surface of the semiconductor substrate, and a photogate electrode PG is formed via the insulating layer 5 on the p-type semiconductor region 3 between the accumulation regions fd1 and fd2. A part directly under the photogate electrode within the semiconductor region 3 acts as a light detecting region 4. A potential of the light detecting region 4 can be controlled by a voltage applied to the photogate electrode PG.

Signal taking electrodes Vfd1, Vfd2 are respectively installed on the accumulation regions fd1, fd2 so as to be electrically connected. Further, transfer electrodes TX1, TX2 are positioned between the photogate electrode PG and each of the signal taking electrodes Vfd1, Vfd2. An n-type semiconductor has an electron as a carrier in an electrically neutral state and is positively ionized where the carrier is removed. In other words, the n-type accumulation regions fd1, fd2 higher in concentration are recessed downward significantly and constitute a potential well.

A positive direct-current potential is slightly applied to the photogate electrode PG, whenever necessary. At the light detecting region 4 as a photosensitive region, a hole-electron pair will occur depending on light which is made incident. Where a positive potential is imparted to the transfer electrodes TX1, TX2 functioning as gate electrodes, a potential at a region directly under the TX1, TX2 is given as an intermediate value between the potential of the light detecting region 4 and the potential of the accumulation regions fd1, fd2. There are formed steps of the potential from the light detecting region 4 to the accumulation regions fd1, fd2, and electrons are dropped into the potential wells of the accumulation regions fd1, fd2 and accumulated.

This structure is that in which the electrodes are installed on the accumulation regions fd1, fd2 to take out a signal. It is, however, possible that high-concentration regions for taking out a signal are separately provided adjacent to the accumulation regions fd1, fd2, and other transfer electrodes are placed on regions between the high-concentration regions and the accumulation regions fd1, fd2 to install the electrodes on the high-concentration regions, thereby taking out the signal.

In the following description, for the purpose of clarification, the symbols Vfd1, Vfd2 are to depict signal taking electrodes and also voltages that are imparted between the electrodes and a ground potential. Further, the symbols TX1, TX2, are to depict transfer electrodes and also transfer voltages that are applied between the transfer electrodes and a ground potential. Still further, the symbol PG is to depict a photogate electrode and also a direct voltage that is applied between the photogate electrode and a ground potential. It is noted that the semiconductor region 3 is connected to a ground potential. Charges taken out from the signal taking electrodes Vfd1, Vfd2 are read out by a reading circuit RC formed within the semiconductor region 3. The reading circuit is not necessarily formed in the semiconductor region 3 but may be formed on the semiconductor substrate 2.

Figure 3:
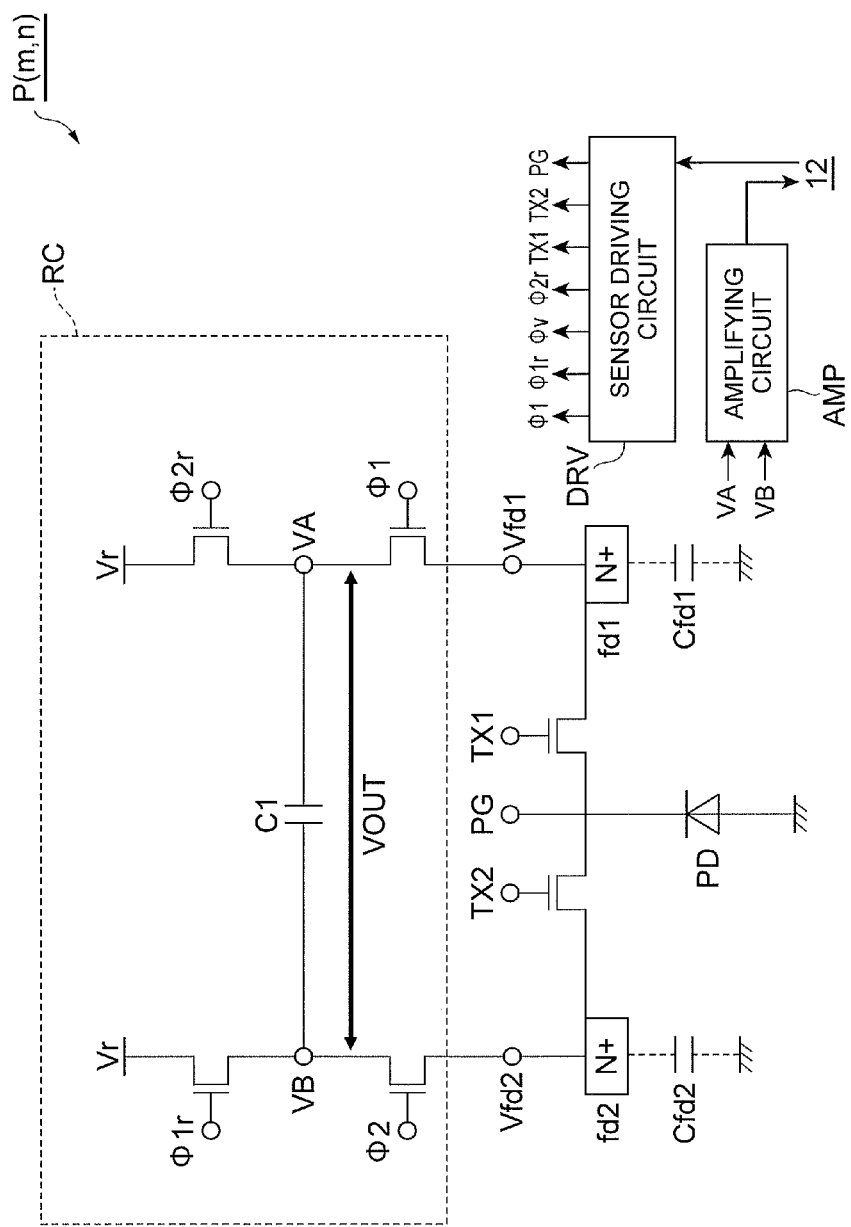
FIG. 3 is a circuit diagram of each pixel of the range image sensor given in FIG. 2.

FIG. 3 is a circuit diagram which shows each pixel of the range image sensor given in FIG. 2.

Each pixel P (m, n) is provided with a photosensitive region (photo diode PD) which generates charges in response to reflected light which is made incident and a first accumulation region fd1 and a second accumulation region fd2 adjacent to the photo diode PD. The first transfer electrode TX1 and the second transfer electrode TX2 respectively control charges which will flow into the first accumulation region fd1 and the second accumulation region fd2. A capacitor C1 is electrically connected between the electrodes Vfd1, Vfd2 of the first and the second accumulation regions fd1, fd2 respectively via switches Φ1, Φ2 composed of a transistor.

The first switch Φ1 is interposed between a first terminal of the capacitor C1 (the terminal on the right side in the drawing: node VA) and the first accumulation region fd1, and the second switch Φ2 is interposed between a second terminal of the capacitor C1 (the terminal on the left side in the drawing: node VB) and the second accumulation region fd2. Further, a third switch Φ1r composed of a transistor is interposed between the second terminal of the capacitor C1 (the terminal on the left side in the drawing: node VB) and a positive reference potential Vr. A fourth switch Φ2r is interposed between the first terminal of the capacitor C1 (the terminal on the right side in the drawing: node VA) and the reference potential Vr. These elements constitute the reading circuit RC given in FIG. 2 within one pixel P (m, n). In this instance, the reference potential may be a power source potential or a potential generated from the power source potential.

For the purpose of clarifying the description, the symbols, Φ1, Φ2, Φ1r, Φ2r are to depict switches and also voltages that are given between each of the switches and a ground. Further, the symbols VA, VB are to depict nodes and also voltages between the nodes positioned on both ends of the capacitor C1 and a ground potential.

Parasitic capacities Cfd1, Cfd2 are interposed between the accumulation regions fd1, fd2 and a ground potential. The sensor driving circuit DRV outputs various signal voltages Φ1, Φ1r, Φ2, Φ2r, TX1, TX2, PG. The signal voltages Φ1, Φ1r, Φ2, Φ2r are applied respectively to control terminals of the switches Φ1, Φ1r, Φ2, Φ2r composed of a transistor (a gate electrode in the case of a field effect transistor, a base electrode in the case of a bipolar transistor). The transfer voltages TX1, TX2 which are reversed phase signals are respectively imparted to the transfer electrodes TX1, TX2 which constitute gate electrodes of an MOS transistor. A direct current voltage PG is imparted to the photogate electrode PG. Where the transfer voltages TX1, TX2 are high in level, regions lower in potential than the light detecting region 4 directly under the photogate electrode PG are formed directly under the transfer electrodes. Therefore, electrons generated at the photo diode PD are transferred and flow into the accumulation regions fd1, fd2 which are lower in potential than the regions directly under the transfer electrodes.

When charges are accumulated within the accumulation regions fd1, fd2, the charges are transferred to the capacitor C1. Charges derived from background light are also accumulated at the accumulation regions fd1, fd2. However, the charge quantity derived from the background light can be considered the same within both the accumulation regions fd1, fd2. Thus, where these charges are transferred respectively to both terminals of the capacitor C1, the charges are canceled. Therefore, in order to determine the charge quantity of a signal component, the charges accumulated at the accumulation regions fd1, fd2 may be transferred to a single capacitor C1.

The voltages VA, VB of both terminals of the capacitor C1 are input into the amplifying circuit AMP and the output of the amplifying circuit AMP is input into the controlling circuit 12. At the amplifying circuit AMP or the controlling circuit 12, a difference VOUT (=VA−VB=Vfd1−Vfd2) between the input voltages VA, VB is calculated. This difference is proportional to a ratio of accumulated charge quantity which is changed in distribution ratio due to delayed return from radiation timing, in other words, a distance up to an object.

Next, a description will be given of circuit actions.

FIG. 4 to FIG. 11 are views for describing actions of the range image sensor according to the embodiment. Only sites necessary for describing the actions are shown schematically.

Figure 4:
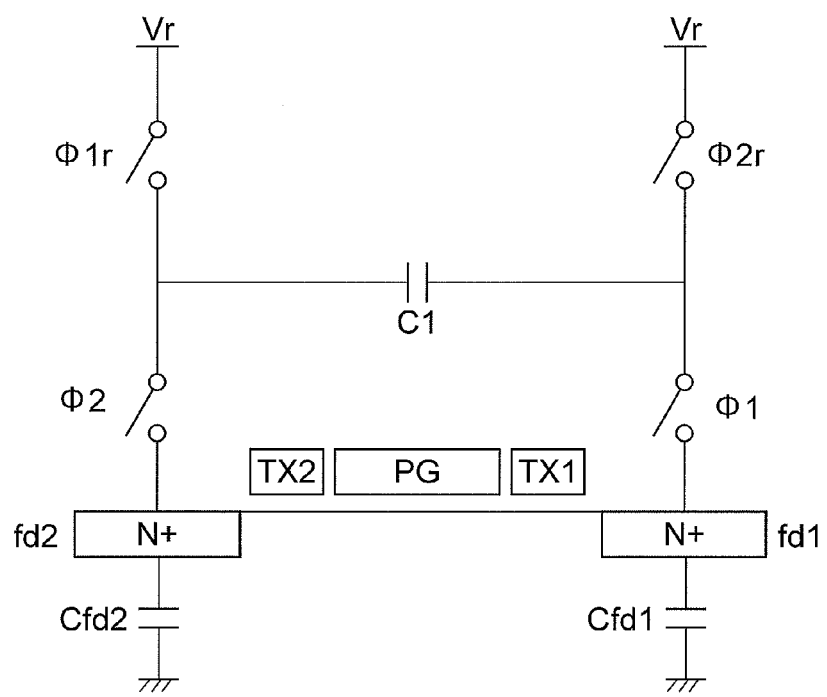
FIG. 4 is a view for describing actions of the range image sensor according to the embodiment.

FIG. 4 shows a state that all the switches, Φ1, Φ1r, Φ2, Φ2r, are turned OFF after reset and no charges are present in a pixel.

Figure 5:
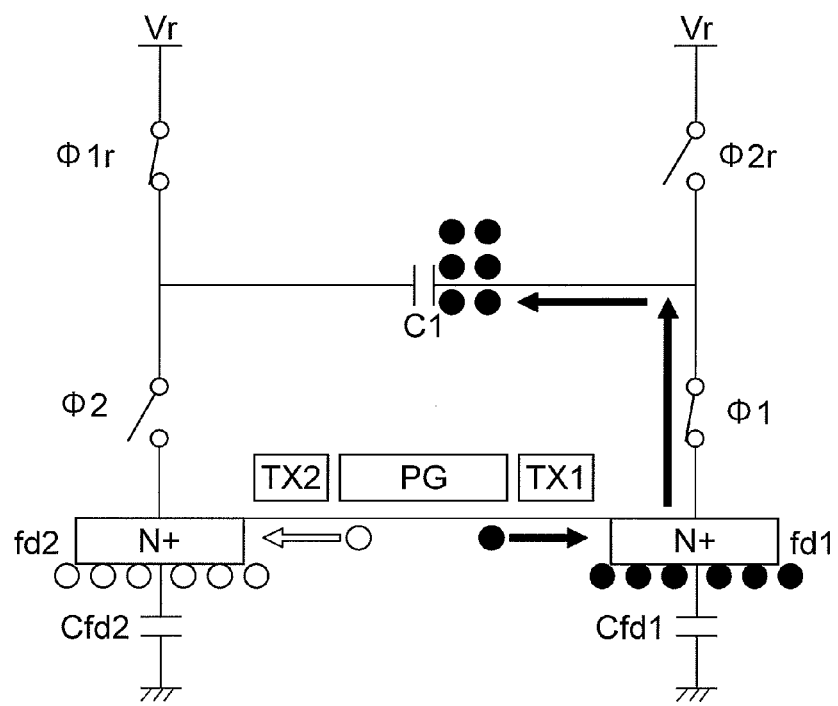
FIG. 5 is a view for describing actions of the range image sensor according to the embodiment.
Figure 6:
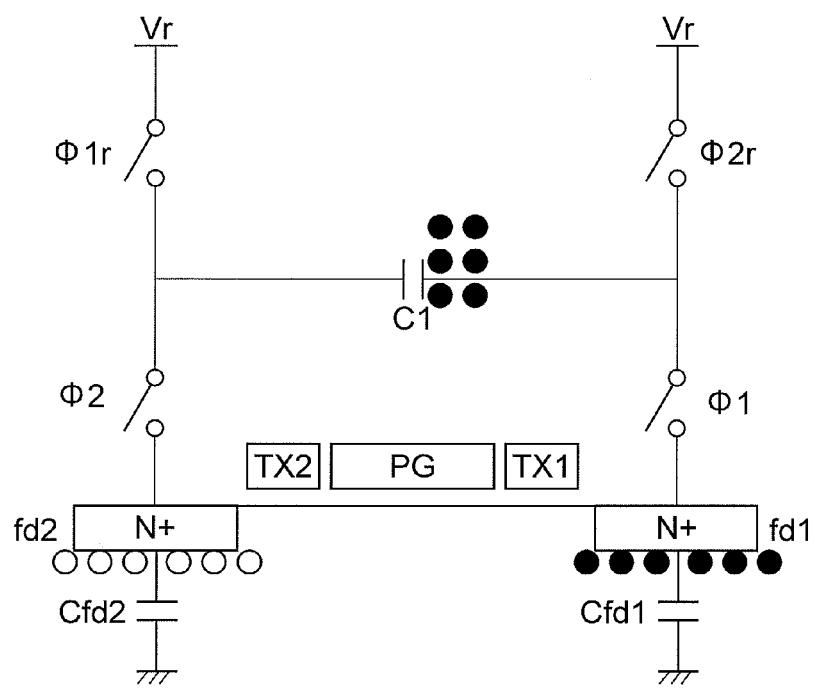
FIG. 6 is a view for describing actions of the range image sensor according to the embodiment.

FIG. 5 shows a state that where light is made incident directly under the photogate electrode PG and electrons are generated as carriers, the switches Φ1, Φ1r are turned ON and Φ2, Φ2r are turned OFF. Black circles in the drawing depict electrons flowing into the accumulation region fd1 on the right side, while white circles in the drawing depict electrons flowing into the accumulation region fd2 on the left side. In this drawing, since timing of return light is delayed from radiation timing, it is assumed that twelve charges have flowed into the right side and six charges have flowed into the left side. These charge quantities contain components derived from background light. The charges which have flowed into the accumulation region fd1 on the right side will also flow into one terminal of the capacitor C1 via the switch Φ1 to divide the charges. In this state, as shown in FIG. 6, all the switches, Φ1, Φ1r, Φ2, Φ2r, are turned OFF and the charges are allowed to remain at one terminal of the capacitor C1.

Figure 7:
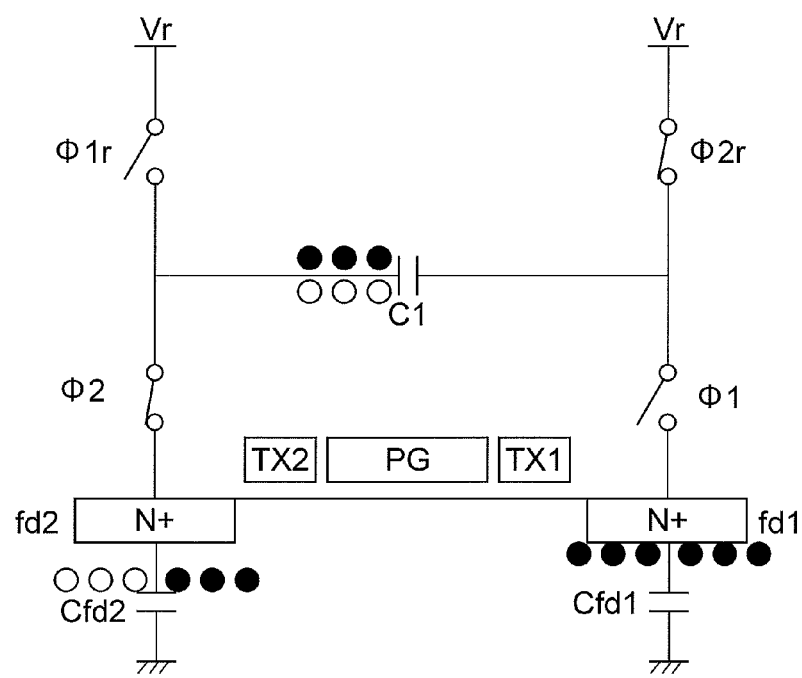
FIG. 7 is a view for describing actions of the range image sensor according to the embodiment.
Figure 8:
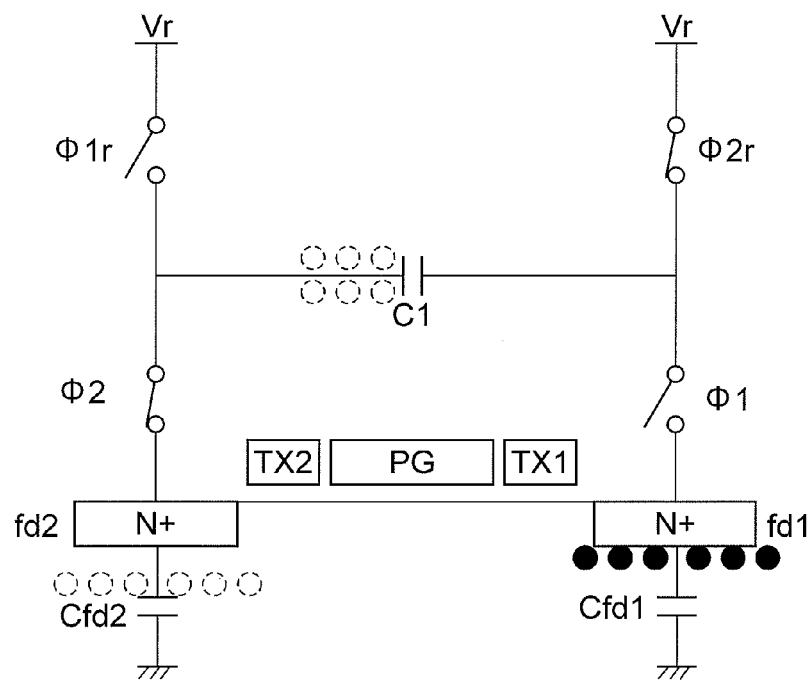
FIG. 8 is a view for describing actions of the range image sensor according to the embodiment.

FIG. 7 shows a state that thereafter, the switches Φ1, Φ1r are turned OFF and Φ2, Φ2r are turned ON. The charges which have been accumulated at the accumulation region fd2 on the left side are divided and flow into the other terminal of the capacitor C1, by which the charges are divided. The charges which have been accumulated on the right side of the capacitor C1 are given as reversed polar charges which have been accumulated at a reversed terminal. In other words, as shown in FIG. 8, the charges which have been accumulated on the right side of the capacitor C1 and the charges which have been accumulated at the accumulation region fd2 on the left side are canceled and disappear. And, only six charges will remain at the accumulation region fd1 on the right side.

Figure 9:
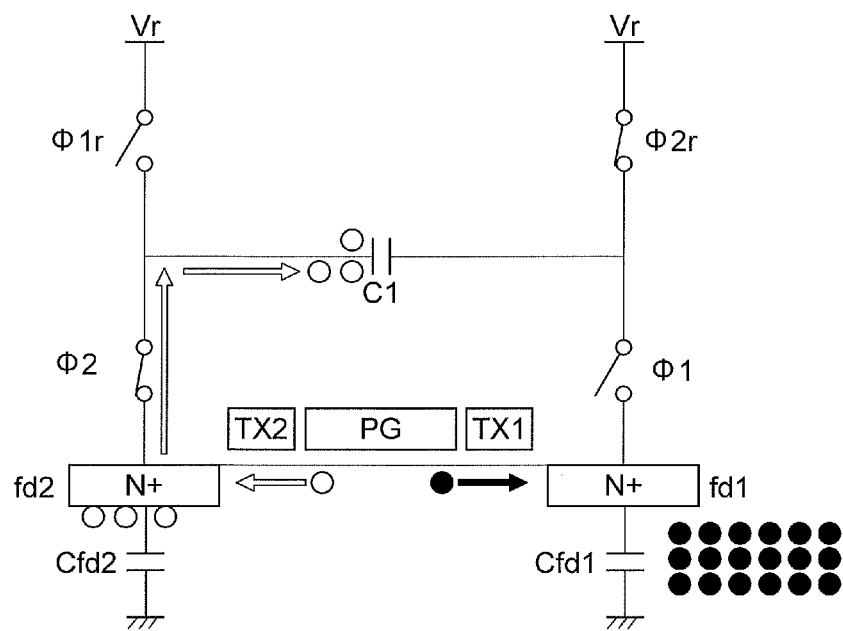
FIG. 9 is a view for describing actions of the range image sensor according to the embodiment.
Figure 10:
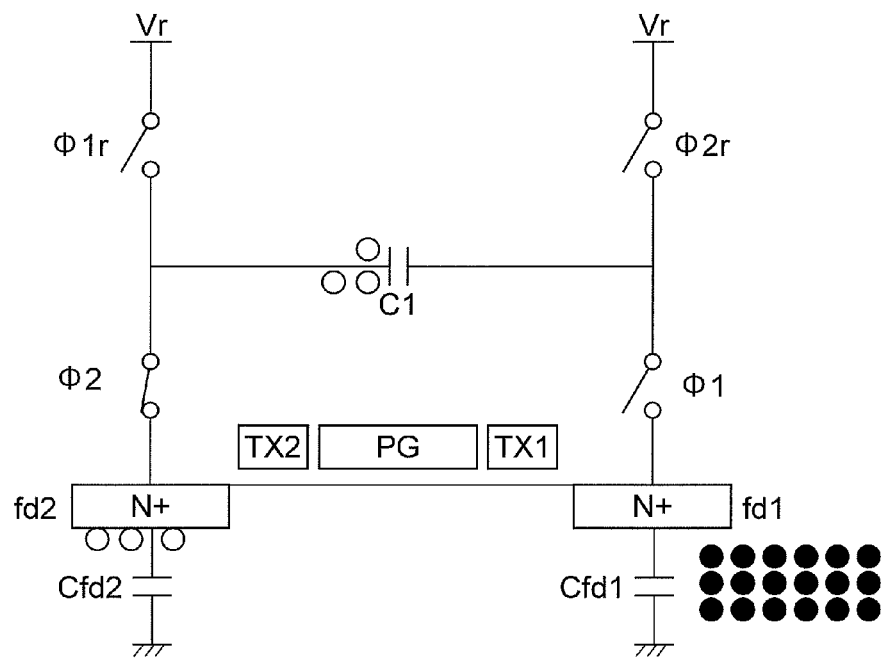
FIG. 10 is a view for describing actions of the range image sensor according to the embodiment.
Figure 11:
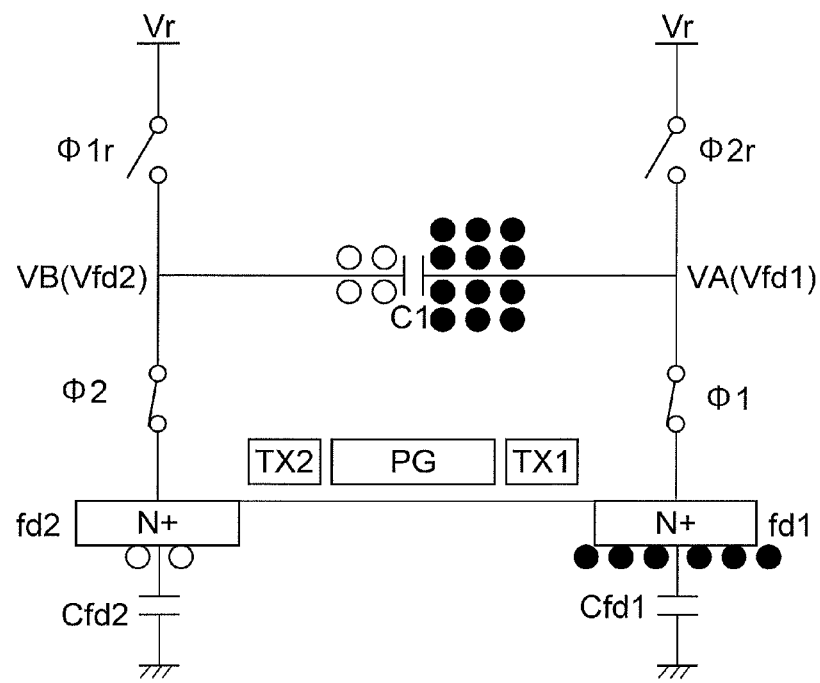
FIG. 11 is a view for describing actions of the range image sensor according to the embodiment.

FIG. 9 shows a state that thereafter, additionally, twelve charges have flowed into the accumulation region fd1 on the right side and six charges have flowed into the accumulation region fd2 on the left side in response to light which is made incident. Thus, in total, eighteen charges have been accumulated on the right side. Since the switch Φ2 is connected, the charges are divided and three charges will flow into the left-side terminal of the capacitor C1. FIG. 10 shows a state that the switch Φ2r is turned OFF from a state given in FIG. 9 and the state given in FIG. 9 is kept. FIG. 11 shows a state that thereafter, the switches Φ1, Φ2 are turned ON and the charges which have been accumulated at the accumulation region fd1 on the right side are transferred to the capacitor C1. The accumulated charge quantities are redistributed according to the capacitor volume. In this drawing, a ratio of the charge quantities on the left side to those on the right side is 2:6. In this state, the voltages VA, VB (Vfd1, Vfd2) on both ends of the capacitor C1 are read out respectively. Where it is assumed that each of the capacitors C1, Cfd1, Cfd2 is equal in capacity (capacity=C) and the charge quantity which has been accumulated at the accumulation region fd1 on the right side during T second is given as Q1 and the charge quantity which has been accumulated at the accumulation region fd2 on the left side during T second is given as Q2, voltages of them after n×T second will be given by the following equations, however, under the conditions that n is equal to 2 m and m is a natural number.

$$Vfd1=(1/(3\times C))\cdot(5/2)\times Q1+2\times Q2)$$

$$Vfd2=(1/(3\times C))\cdot((1/2)\times Q1+4\times Q2)$$

$$VOUT=Vfd1-Vfd2=n(Q1-Q2)/3C$$

Figure 12:
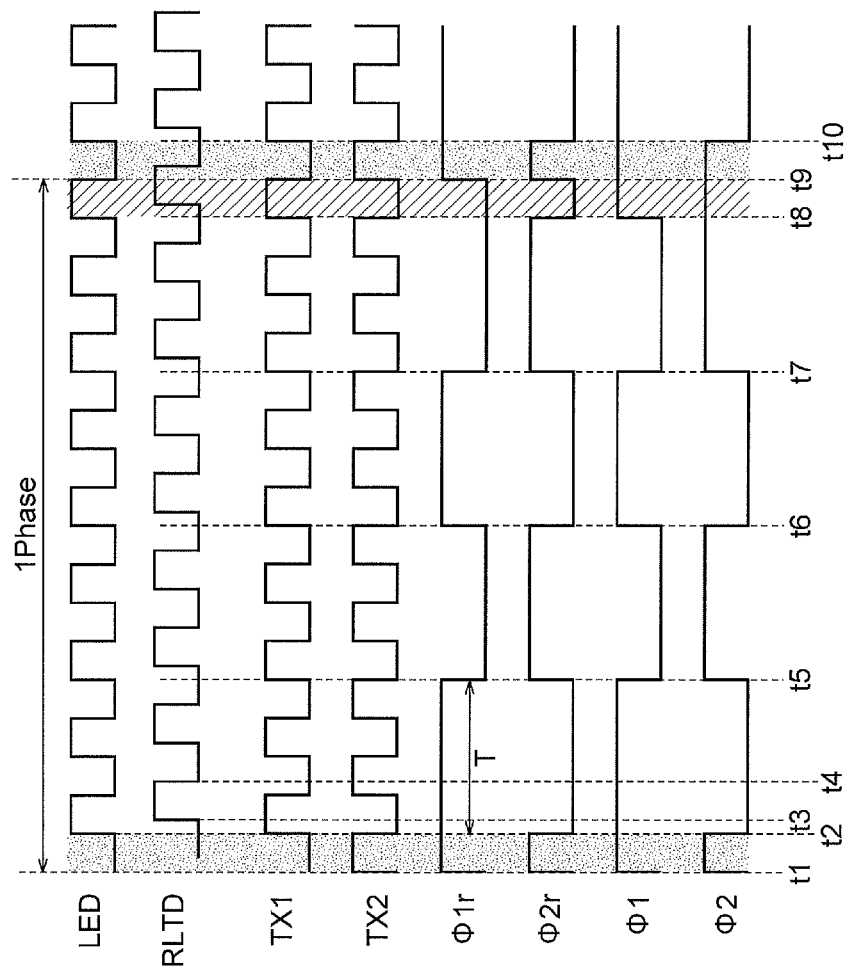
FIG. 12 is a first timing chart of the range image sensor according to the embodiment.

FIG. 12 is a first timing chart of the range image sensor according to the embodiment.

A period from reset-starting time t1 of this time to reset-starting time t9 of next time is given as one unit of detection period (1 phase). During time t1 to time t2, all the switches Φ1r, Φ2r, Φ1, Φ2 are turned ON, and the capacitor C1 and the accumulation regions fd1, fd2 are reset to an initial state.

Thereafter, a period from time t2 to time t5 is given as one transfer period T to a capacitor. While the transfer voltages TX1, TX2 composed of square waves reversed in phase are applied to the transfer electrodes TX1, TX2, the switches Φ1r, Φ1 are turned ON (high level) and the switches Φ2r, Φ2 are turned OFF (low level). Thereby, the charges which have been accumulated at the accumulation region fd1 on the right side are transferred to the right-side terminal of the capacitor C1. Then, during a transfer period T from time t5 to time t6 as well, while the transfer voltages TX1, TX2 composed of square waves reversed in phase are applied to the transfer electrodes TX1, TX2, the switches Φ1r, Φ1 are turned OFF (low level) and the switches Φ2r, Φ2 are turned ON (high level). Thereby, the charges which have been accumulated at the accumulation region fd2 on the left side are transferred to the other terminal of the capacitor C1. It is noted that over-lapped charge components are canceled on switching the switches.

Hereinafter, similarly, during a transfer period T from time t6 to time t7 and during a transfer period T from time t7 to time t8, the charges are transferred to the capacitor C1. Thereafter, during a period from time t8 to time t9, a signal is read out and during a next period from time t9 to time t10, reset is conducted again. In reading out the signal, the switches Φ1 and Φ2 are turned ON and Φ1r, Φ2r are turned OFF.

It is noted that the drawing shows an intensity signal LED of radiated light from a light source and an intensity signal RLTD of reflected light. In the drawing, for simplifying the description, the waves are shown in square waves. Delayed time of the reflected light with respect to the radiated light corresponds to a distance up to an object. In other words, a period from time t2 to time t3 is time during which light travels back and forth a distance from the light source to the object. As a matter of course, a driving signal to the light source is a square wave. The rising time and falling time of the driving signal are in agreement with the rising time and falling time of the transfer voltage TX1.

A charge quantity transferred into the accumulation region fd1 on the right side in a period during which the transfer voltage TX1 is high in level is given as Q1, and a charge quantity transferred into the accumulation region fd2 on the left side in a period during which the transfer voltage TX2 is high in level is given as Q2. Then, there is developed delayed time between the radiated light and the reflected light by a ratio of the charge quantity Q2 to an overall charge quantity (Q1+Q2). The delayed time corresponds to two times a distance L up to an object. The charges are integrated to improve detection accuracy.

The total charge quantity Q1+Q2 (including integration) is proportional to brightness at each pixel. Therefore, a controlling circuit is used to determine Vfd1+Vfd2 (=VA+VB), thus making it possible to obtain an ordinary brightness image.

Here, the driving circuit DRV sets a reset period (from time t1 to time t2) during which all the switches (Φ1, Φ2, Φ1r, Φ2r) are turned ON at the initial time of one cycle (1 phase) and sets alternately a first period (given as time t2 to time t5, time t6 to time t7: T1) and a second period (given as time t5 to time t6, time t7 to time t8: T2) within one cycle (1 phase).

Then, in the first period (T1), the switches (Φ1, Φ1r) are both turned ON and the switches (Φ2, Φ2r) are both turned OFF. In the second period (T2), both the switches (Φ1, Φ1r) are turned OFF, and both the second and the fourth switches (Φ2, Φ2r) are turned ON. Within one cycle (1 phase), the modulating signals TX1, TX2 which are in synchronization with a modulating signal LED of the radiated light and mutually reversed in phase are imparted to the transfer electrodes TX1, TX2.

A noise on the basis of quantum properties of light (photon shot noise) is increased by the square root of exposed light quantity, and a signal component is increased proportionally. Thus, the more exposure time is increased, the more a percentage of the signal component is increased, thereby improving a signal-noise ratio. Therefore, the more the charges which have been distributed within the first and the second accumulation regions fd1, fd2 by the transfer electrodes TX1, TX2 are integrated, the more the signal-noise ratio is improved. It is, thus, possible to obtain an accurate range image (brightness image). The modulating signals TX1, TX2 are imparted to the transfer electrodes TX1, TX2, by which charges during a certain period are integrated at the accumulation regions fd1, fd2. At the same time or after the integration, the charges which have been integrated at the accumulation region fd1 are connected to the right-side terminal VA of the capacitor C1 in the first period (T1), and the charges which have been integrated at the accumulation region fd2 are connected to the left-side terminal VB of the capacitor C1 in the second period (T2). Within the capacitor C1, charge components contained in both the accumulation regions fd1, fd2, in other words, background light components, are canceled.

Here, since each of the accumulation regions fd1, fd2 is connected only to a single capacitor C1, a pixel can be decreased in size to improve spatial resolution. Further, since the charges which have been transferred into the accumulation regions fd1, fd2 are integrated, the signal-noise ratio is improved and also the number of switching of the switches Q1, Q2 is decreased on transferring the charges to the capacitor C1. As a result, a switching noise is also decreased to accumulate charges according to a distance inside the capacitor C1. And, the charge quantities (corresponding voltages) are detected, thus making it possible to calculate an accurate distance.

Figure 13:
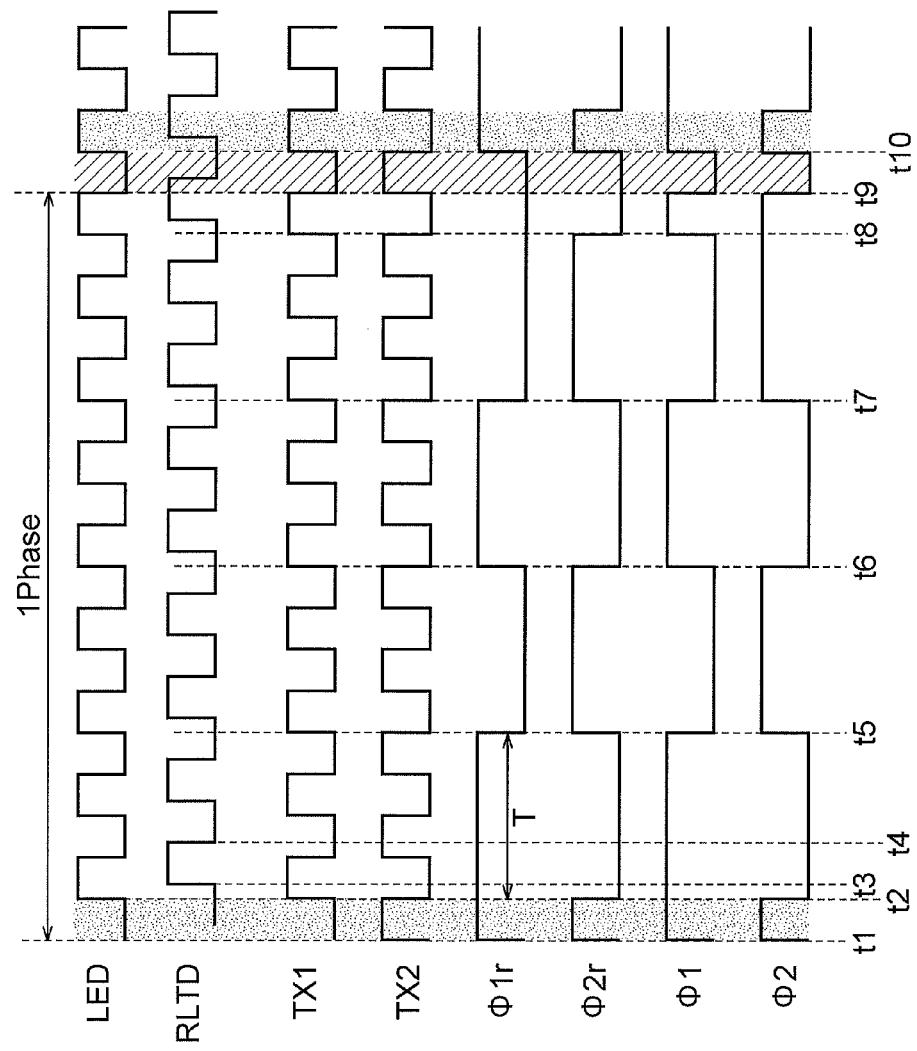
FIG. 13 is a second timing chart of the range image sensor according to the embodiment.

FIG. 13 is a second timing chart of the range image sensor according to the embodiment. In the timing chart, a signal is read out during a period between time t9 and time t10, with other constitutions being similar to those of the first timing chart. In other words, the signal is read out in a state that all the switches Φ1, Φ2, Φ1r, Φ2r are turned OFF.

Figure 14:
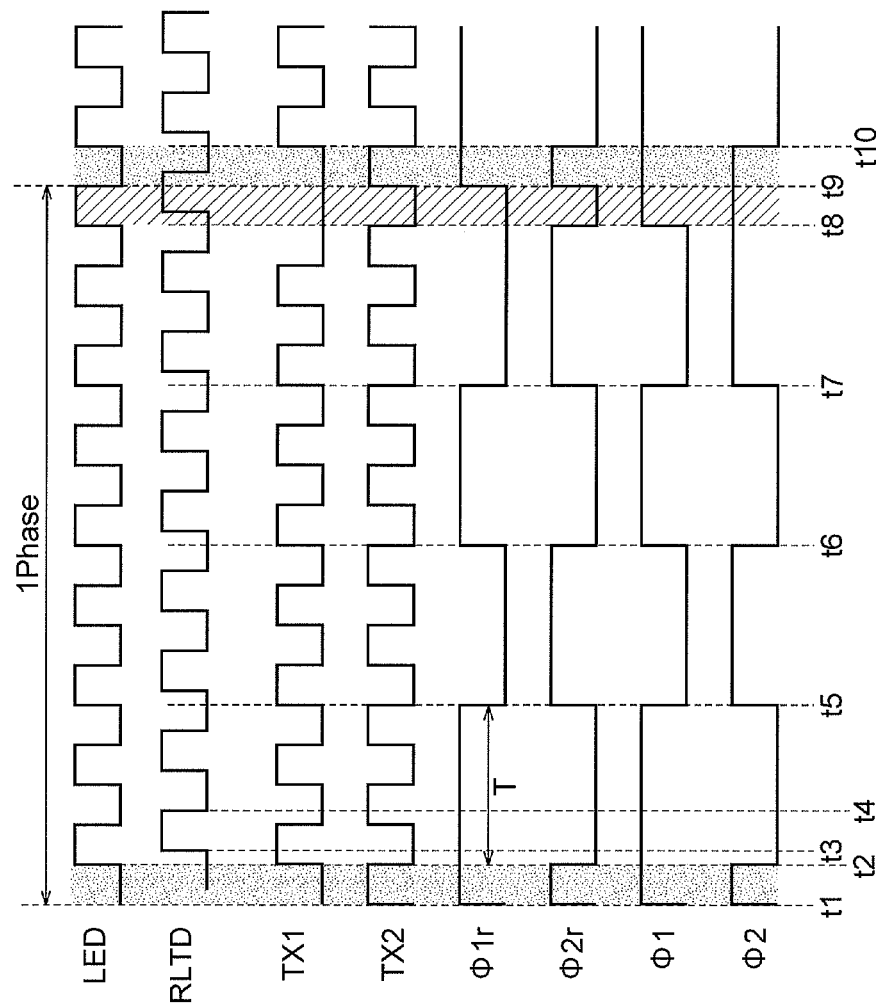
FIG. 14 is a third timing chart of the range image sensor according to the embodiment.

FIG. 14 is a third timing chart of the range image sensor according to the embodiment.

In this timing chart, a period during which both the transfer voltages TX1, TX2 are turned OFF is set between time t8 and time t9. And, a signal is read out during the period. Other constitutions are similar to those of the first timing chart.

Figure 15:
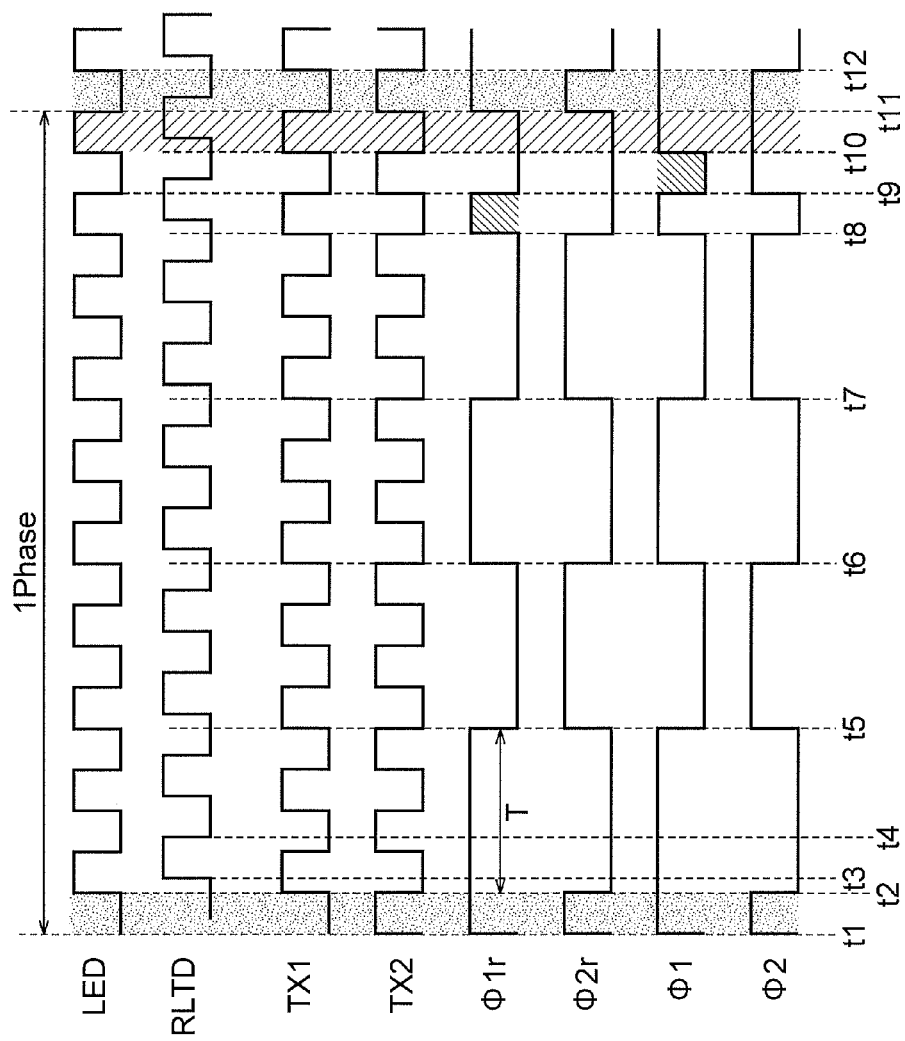
FIG. 15 is a fourth timing chart of the range image sensor according to the embodiment.

FIG. 15 is a fourth timing chart of the range image sensor according to the embodiment. This timing chart is a modification of the first timing chart and provided with a dummy switching period.

In the above-described range image sensor, there is a difference between the number of switching of the switches on transferring the charges integrated at the accumulation regions fd1, fd2 to the capacitor C1. In this instance, it is impossible to sufficiently cancel offset which occurs due to the fact that the number of connections is larger at one of the accumulation regions.

Therefore, the driving circuit DRV is to additionally switch the first or the second switch (Φ1 or Φ2) (in this example, the switch Φ1 is turned OFF and ON at time t9 and time t10) so that the number of switching of the first switch (Φ1) is equal to the number of switching of the second switch (Φ2) during a period after termination of the reset period (time t2 to time t11) within one cycle (1 phase). In this instance, additional switching (hereinafter, referred to as dummy switching) is done to make equal the number of switching of the switches, thereby canceling the offset. It is, thus, possible to obtain a more accurate range image.

Similarly, the third or the fourth switch (Φ1r or Φ2r) is additionally switched (in this example, the switch Φ1r is turned ON and OFF at time t8 and time t9) so that the number of switching of the third switch (Φ1r) is equal to the number of switching of the fourth switch (Φ2r) during a period after termination of the reset period (from time t2 to time t11) within one cycle (1 phase). In this instance, additional switching (hereinafter, referred to as dummy switching) is done to make equal the number of switching of the switches, thereby canceling the offset. It is, thus, possible to obtain a more accurate range image.

Figure 16:
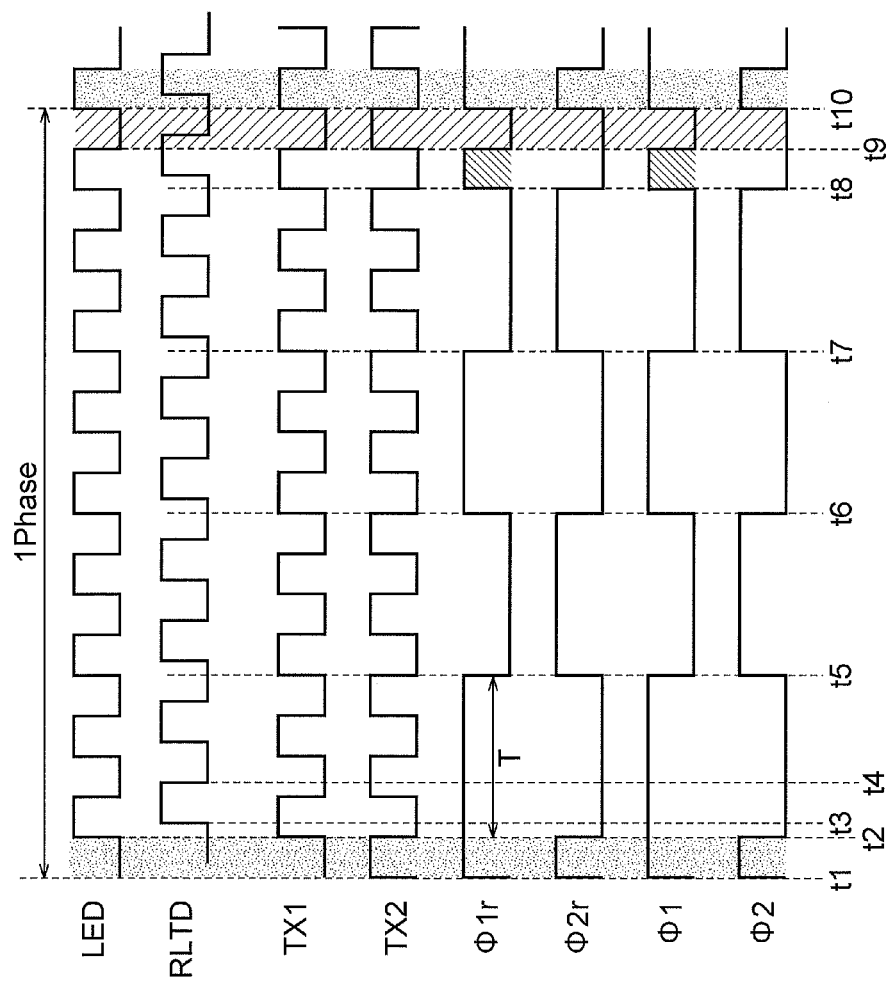
FIG. 16 is a fifth timing chart of the range image sensor according to the embodiment.

FIG. 16 is a fifth timing chart of the range image sensor according to the embodiment. This timing chart is a modification of the second timing chart and provided with a dummy switching period.

As with the above description, the driving circuit DRV is to additionally switch the first or the second switch (Φ1 or Φ2) (in this example, the switch Φ1 is turned OFF and ON at time t9 and time t10) so that the number of switching of the first switch (Φ1) is equal to the number of switching of the second switch (Φ2) during a period after termination of the reset period (time t2 to time t10) within one cycle (1 phase). In this instance, additional switching (hereinafter, referred to as dummy switching) is done to make equal the number of switching of the switches, thereby canceling the offset. It is, thus, possible to obtain a more accurate range image.

Figure 17:
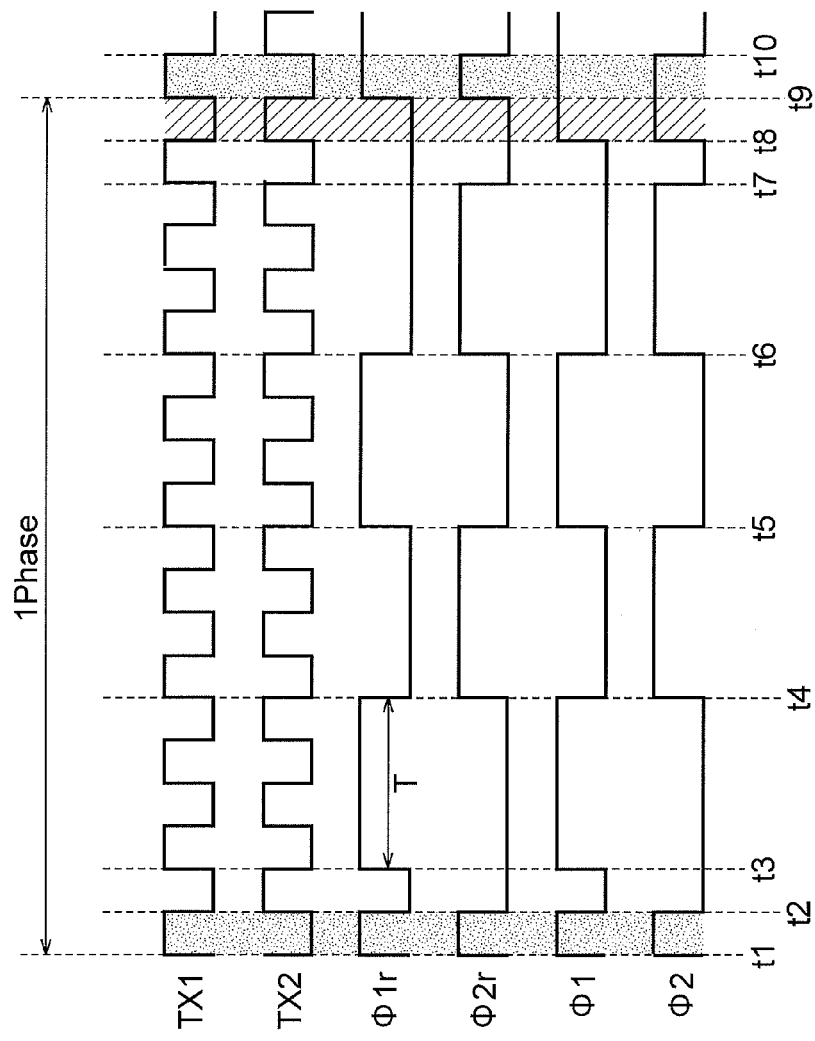
FIG. 17 is a sixth timing chart of the range image sensor according to the embodiment.

FIG. 17 is a sixth timing chart of the range image sensor according to the embodiment. This timing chart is a modification of the first timing chart and provided with a dummy switching period.

As with the above description, the driving circuit DRV is to additionally switch the first or the second switch (Φ1 or Φ1r) (in this example, the switches Φ1 and Φ1r are turned OFF and ON immediately after the reset period (t1 to t2) so that the number of switching of the first switch (Φ1) is equal to the number of switching of the second switch (Φ1r) during a period after termination of the reset period (time t2 to time t9) within one cycle (1 phase). In this instance, additional switching (hereinafter, referred to as dummy switching) is done to make equal the number of switching of the switches, thereby canceling the offset. It is, thus, possible to obtain a more accurate range image. It is noted that time t8 to time t9 is a period for reading a signal and time t9 to time t10 is a next reset period. Accumulation is started after all the switches are reset first.

Figure 18:
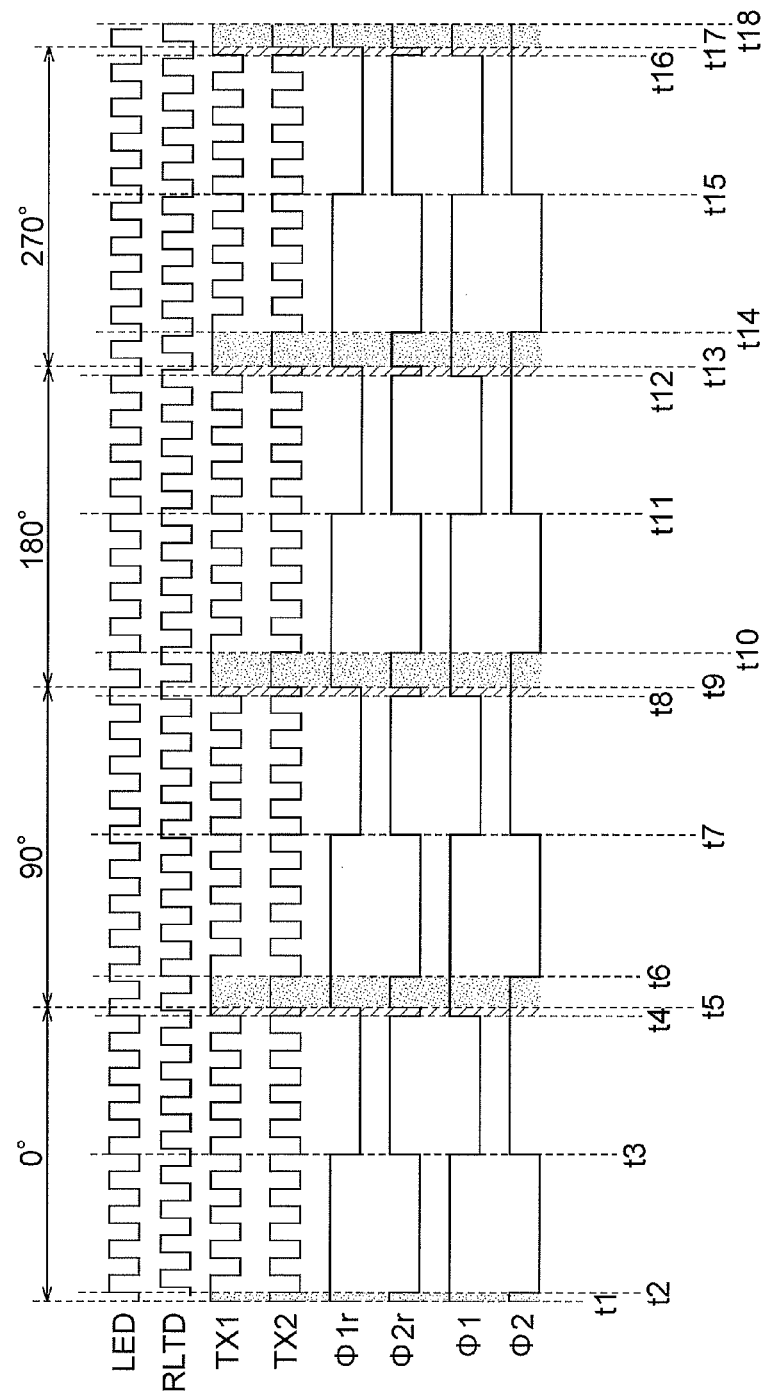
FIG. 18 is a seventh timing chart of the range image sensor according to the embodiment.

FIG. 18 is a seventh timing chart of the range image sensor according to the embodiment. Time t1 to t2, t5 to t6, t9 to t10, t13 to t14, t17 to t18 are reset periods, while time t4 to t5, t8 to t9, t12 to t13, t16 to t17 are periods for reading a signal.

Where no dummy switching is used, the number of switching of the switch on transferring charges to the capacitor C1 is different at each terminal of the capacitor C1. However, in the present invention, in the following four phases of (a) to (d), a difference in charges (corresponding voltages) accumulated at each of the accumulation regions fd1, fd2 is taken, thus making it possible to cancel background light components and offset components as well. It is, thereby, possible to calculate an accurate distance.

In other words, in the range image sensor, the driving circuit DRV imparts signals in the following manner.

That is, (a) the driving circuit DRV imparts a modulating signal TX1 to the first transfer electrode within a specific one cycle (time t1 to t5) at timing having a phase difference of 0° with respect to a modulating signal LED of radiated light and imparts to the second transfer electrode a modulating signal TX2 reversed in phase to the modulating signal TX1 imparted to the first transfer electrode.

(b) it imparts a modulating signal TX1 to the first transfer electrode within another one cycle (time t5 to t9) at timing having a phase difference of 90° with respect to the modulating signal LED of the radiated light and imparts to the second transfer electrode a modulating signal TX2 reversed in phase to the modulating signal TX1 imparted to the first transfer electrode.

(c) it imparts a modulating signal TX1 to the first transfer electrode within still another one cycle (time t9 to t13) at timing having a phase difference of 180° with respect to the modulating signal LED of the radiated light and imparts to the second transfer electrode a modulating signal TX2 reversed in phase to the modulating signal TX1 imparted to the first transfer electrode.

(d) it imparts a modulating signal TX1 to the first transfer electrode within another one cycle different from the above (time t13 to t17) at timing having a phase difference of 270° with respect to the modulating signal LED of the radiated light and imparts to the second transfer electrode a modulating signal TX2 reversed in phase to the modulating signal TX1 imparted to the first transfer electrode.

It is noted that the order of the first period (T1: a period during which Φ1 and Φ1r are turned ON) and the second period (T2: a period during which Φ2 and Φ2r are turned ON) within each of the above-described one cycles of (a) to (d) is the same.

As described above, the four phases (0°, 90°, 180° and 270°) and the voltages Vfd1, Vfd2 (VA, VB) in each phase are used to cancel offset, thus making it possible to determine a distance. In other words, on the assumption that the same quantity of offset is superimposed the voltages Vfd1, Vfd2 in each phase, influences of the offset can be reduced by taking a difference between the voltages Vfd1 and a difference between the voltages Vfd2.

Where the voltages Vfd1, Vfd2 in each phase are indicated as Vfd1 (phase), Vfd2 (phase), the following difference values are determined for the purpose of removing the offset and direct-current components.

$$Vfd(0°) = Vfd1(0°) - Vfd1(180°)$$

$$Vfd(90°) = Vfd1(90°) - Vfd1(270°)$$

$$Vfd(180°) = Vfd2(0°) - Vfd2(180°)$$

$$Vfd(270°) = Vfd2(90°) - Vfd2(270°)$$

Further, in order to remove variances of Vfd1 and Vfd2, the difference values are determined in the following manner.

$$V1 = |Vfd(0°) - Vfd(180°)|$$

$$V2 = |Vfd(90°) - Vfd(270°)|$$

Where a total quantity of signals Vtotal is given as V1+V2, a distance where light travels during a period (t1 to t17) including the four phases is given as V1/Vtotal.

Figure 19:
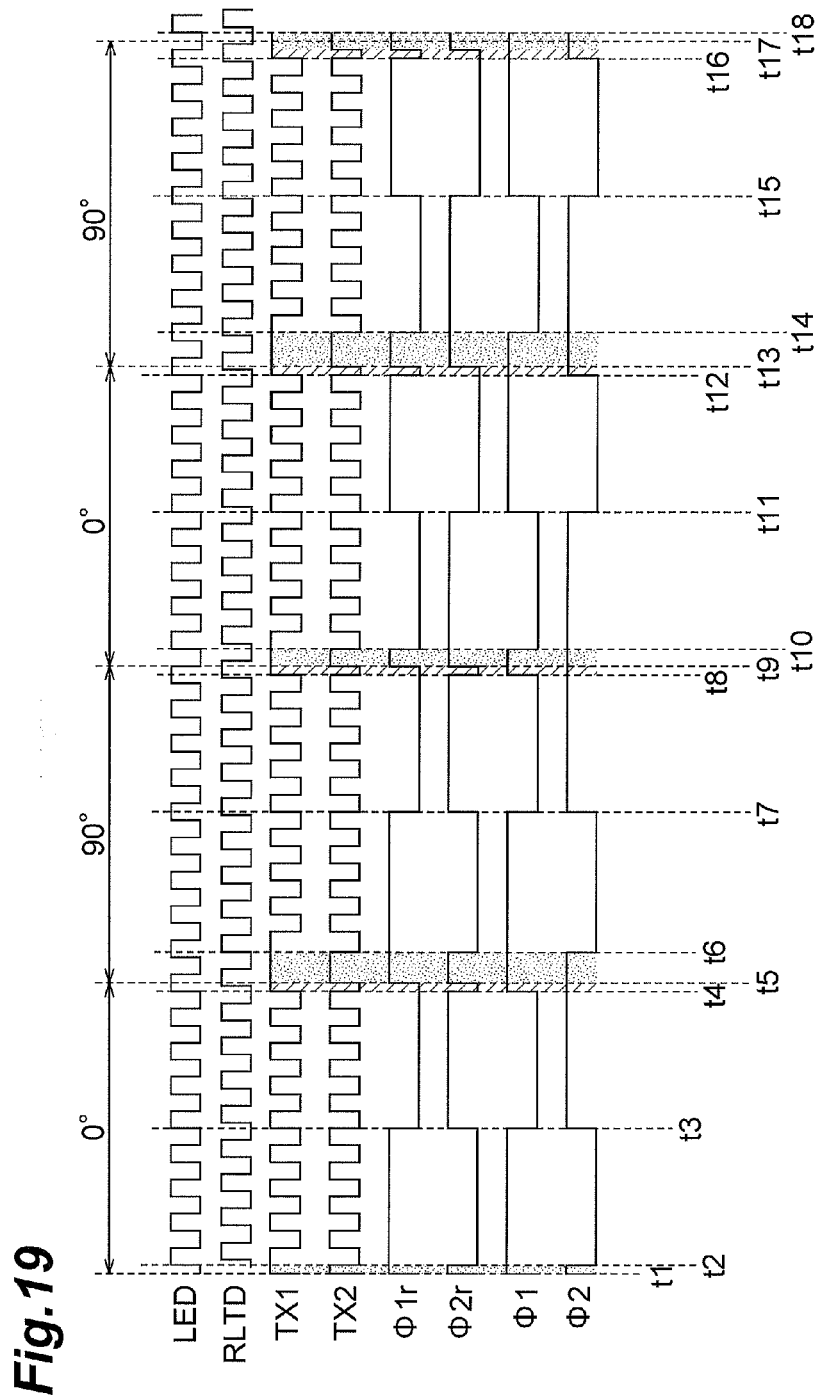
FIG. 19 is an eighth timing chart of the range image sensor according to the embodiment.

FIG. 19 is an eighth timing chart of the range image sensor according to the embodiment. Time t1 to t2, t5 to t6, t9 to t10, t13 to t14, t17 to t18 are reset periods, and time t4 to t5, t8 to t9, t12 to t13, t16 to t17 are periods for reading a signal. In this timing chart, there are used only two phase differences of 0° and 90°. The order for Φ1 and that for Φ2 are reversed in the first half and the second half of the detection period (t1 to t18).

In other words, the driving circuit DRV of the range image sensor imparts signals in the following manner.

That is, (a) the driving circuit DRV imparts a modulating signal TX1 to the first transfer electrode within a specific one cycle (time t1 to t5) at timing having a phase difference of 0° with respect to a modulating signal LED of radiated light and imparts to the second transfer electrode a modulating signal TX2 reversed in phase to the modulating signal TX1 imparted to the first transfer electrode.

(b) it imparts a modulating signal TX1 to the first transfer electrode within another one cycle (time t5 to t9) at timing having a phase difference of 90° with respect to the modulating signal LED of the radiated light and imparts to the second transfer electrode a modulating signal TX2 reversed in phase to the modulating signal TX1 imparted to the first transfer electrode.

(c) it imparts a modulating signal TX1 to the first transfer electrode within still another one cycle (time t9 to t13) at timing having a phase difference of 0° with respect to the modulating signal LED of the radiated light and imparts to the second transfer electrode a modulating signal TX2 reversed in phase to the modulating signal TX1 imparted to the first transfer electrode.

(d) it imparts a modulating signal TX1 to the first transfer electrode within another one cycle different from the above (time t13 to t17) at timing having a phase difference of 90° with respect to the modulating signal LED of the radiated light and imparts to the second transfer electrode a modulating signal TX2 reversed in phase to the modulating signal TX1 imparted to the first transfer electrode.

Then, in this example, the order of the first period (T1: a period during which Φ1 and Φ1r are turned ON) and the second period (T2: a period during which Φ2 and Φ2r are turned ON) within each of the above-described one cycles of (a) and (b) is the same. And, the order of the first period T1 and the second period T2 within each of the above-described one cycles of (c) and (d) is reversed to that within each of the above-described one cycles of (a) and (b).

In the present invention, in the above-described two phases of (a) and (b) and the phases of (c) and (d) different from them in the order of transferring charges to the capacitor C1, a difference in charges (corresponding voltages) accumulated at each of the accumulation regions is taken, thus making it possible to cancel background light components and offset components as well. It is, thereby, possible to calculate an accurate distance.

As described above, it is possible to calculate an accurate distance at each pixel. Therefore, the range image sensor of the present invention is able to obtain an accurate range image.

Where the voltages Vfd1, Vfd2 in each phase are shown as Vfd1 (phase), Vfd2 (phase), the following difference values are determined for the purpose of removing the variances and direct-current components. It is noted that the Vfd1, Vfd2 are to denote voltages in the periods (a), (b) in the first half, while Vfd1', Vfd2' are to denote the voltages in the periods (c), (d) in the second half.

$$Vfd(0°) = Vfd1(0°) - Vfd2(0°)$$

$$Vfd(90°) = Vfd1(90°) - Vfd2(90°)$$

$$Vfd'(0°) = Vfd1'(0°) - Vfd2'(0°)$$

$$Vfd'(90°) = Vfd1'(90°) - Vfd2'(90°)$$

A distance in which light travels during a period (t1 to t17) including the four phases is given as an average of the following distances L1, L2 (=(L1+L2)/2).

$$L1 = Vfd(0°)/(Vfd(0°) + Vfd(90°))$$

$$L2 = Vfd'(0°)/(Vfd'(0°) + Vfd'(90°))$$

REFERENCE SIGNS LIST

1: Range image sensor, IMR: Imaging region, PD: Photosensitive region, fd1, fd2: Accumulation region, TX1, TX2: Transfer electrode, C1: Capacitor, Φ1: First switch, Φ2: Second switch, Φ1r: Third switch, Φ2r: Fourth switch, DRV: Driving circuit.

The invention claimed is:

1. A range image sensor comprising:
an imaging region which receives reflected light of radiated light to an object; and
a driving circuit which drives the imaging region,
wherein
the imaging region comprises a plurality of pixels which are one-dimensionally or two-dimensionally arranged on a semiconductor substrate, each of the pixels includes:
a photosensitive region,
first and second accumulation regions adjacent to the photosensitive region,
first and second transfer electrodes which respectively control charges flowing into the first and the second accumulation regions,
a capacitor which is electrically connected between the first and the second accumulation regions,
a first switch interposed between a first terminal of the capacitor and the first accumulation region,
a second switch interposed between a second terminal of the capacitor and the second accumulation region,
a third switch interposed between the second terminal of the capacitor and a reference potential, and
a fourth switch interposed between the first terminal of the capacitor and the reference potential, and
the driving circuit sets a reset period during which all the first, the second, the third, and the fourth switches are turned ON at the initial time of one cycle, setting alternately a first period and a second period within one cycle,
turning both the first and the third switches ON and turning both the second and the fourth switches OFF in the first period,
turning both the first and the third switches OFF and turning both the second and the fourth switches ON in the second period, and
imparting to the first and the second transfer electrodes modulating signals which are in synchronization with a modulating signal of the radiated light and mutually reversed in phase within the one cycle.

2. The range image sensor according to claim 1, wherein the driving circuit additionally switches the first or the second switch so that the number of switching of the first switch is equal to the number of switching of the second switch after termination of the reset period within the one cycle.

3. The range image sensor according to claim 1, wherein
(a) the driving circuit imparts a modulating signal to the first transfer electrode within a specific one cycle at timing having a phase difference of 0° with respect to the modulating signal of the radiated light and imparts to the second transfer electrode a modulating signal reversed in phase to the modulating signal imparted to the first transfer electrode,
(b) it imparts a modulating signal to the first transfer electrode within another one cycle at timing having a phase difference of 90° with respect to the modulating signal of the radiated light and imparts to the second transfer electrode a modulating signal reversed in phase to the modulating signal imparted to the first transfer electrode,
(c) it imparts a modulating signal to the first transfer electrode within still another one cycle at timing having a phase difference of 180° with respect to the modulating signal of the radiated light and imparts to the second transfer electrode a modulating signal reversed in phase to the modulating signal imparted to the first transfer electrode, and
(d) it imparts a modulating signal to the first transfer electrode within another one cycle different from the above at timing having a phase difference of 270° with respect to the modulating signal of the radiated light and imparts to the second transfer electrode a modulating signal reversed in phase to the modulating signal imparted to the first transfer electrode, and
the order of the first period and the second period within each of the above-described one cycles of (a) to (d) is the same.

4. The range image sensor according to claim 1, wherein
(a) the driving circuit imparts a modulating signal to the first transfer electrode within a specific one cycle at timing having a phase difference of 0° with respect to the modulating signal of the radiated light and imparts to the second transfer electrode a modulating signal reversed in phase to the modulating signal imparted to the first transfer electrode,
(b) it imparts a modulating signal to the first transfer electrode within another one cycle at timing having a phase difference of 90° with respect to the modulating signal of the radiated light and imparts to the second transfer electrode a modulating signal reversed in phase to the modulating signal imparted to the first transfer electrode,
(c) it imparts a modulating signal to the first transfer electrode within still another one cycle at timing having a phase difference of 0° with respect to the modulating signal of the radiated light and imparts to the second transfer electrode a modulating signal reversed in phase to the modulating signal imparted to the first transfer electrode, and
(d) it imparts a modulating signal to the first transfer electrode within another one cycle different from the above at timing having a phase difference of 90° with respect to the modulating signal of the radiated light and imparts to the second transfer electrode a modulating signal reversed in phase to the modulating signal imparted to the first transfer electrode, and
the order of the first period and the second period within each of the above-described one cycles of (a) and (b) is the same, and
the order of the first period and the second period within each of the above-described one cycles of (c) and (d) is reversed to that within each of the one cycles of (a) and (b).

* * * * *